Oct. 22, 1957            G. A. ROUG            2,810,412

SUPPORTING APPARATUS FOR A PORTABLE ROTARY POWER SAW

Filed Dec. 27, 1955            5 Sheets-Sheet 1

*INVENTOR.*
GEORGE A. ROUG
BY R. W. Hodgson

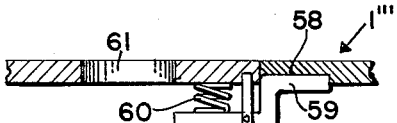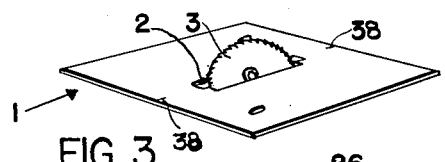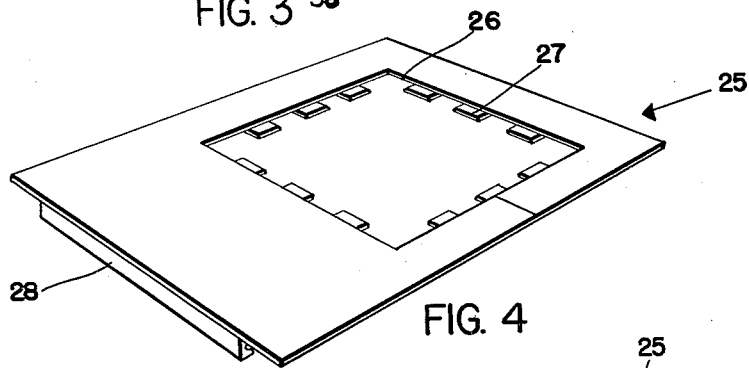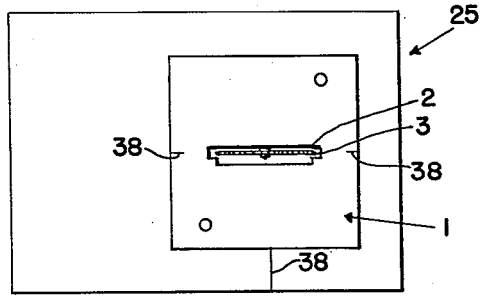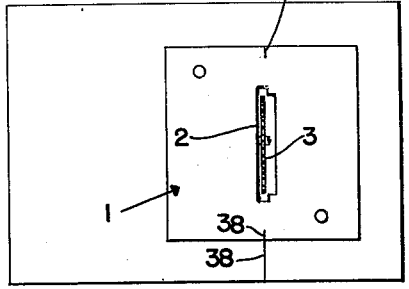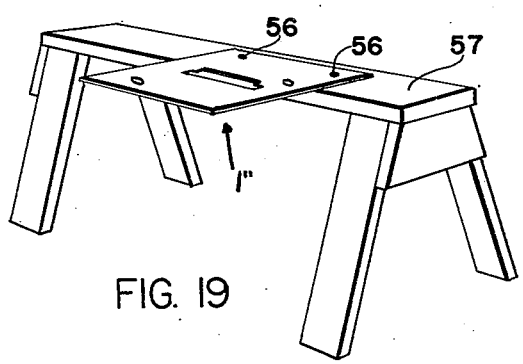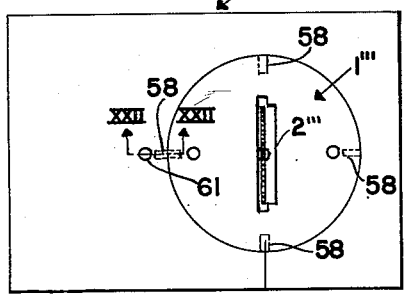

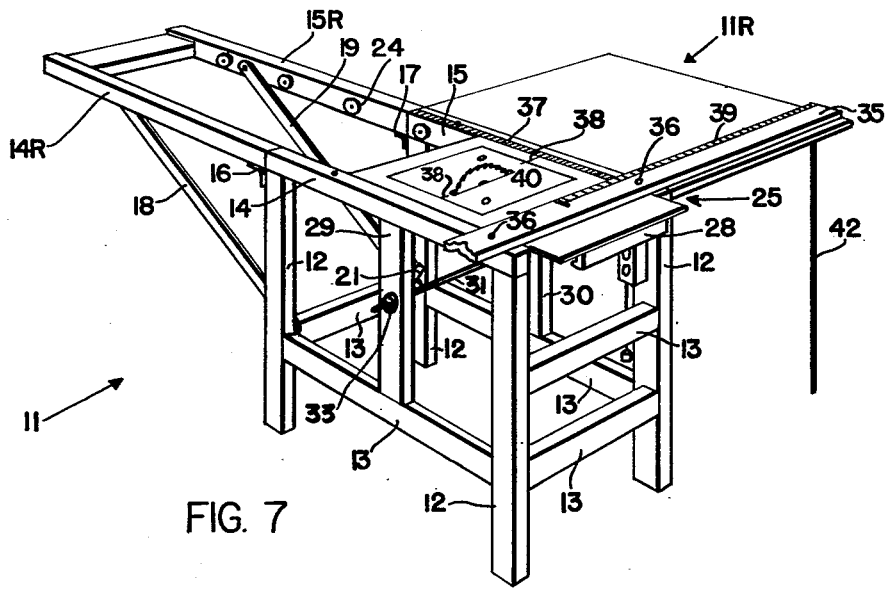
FIG. 7
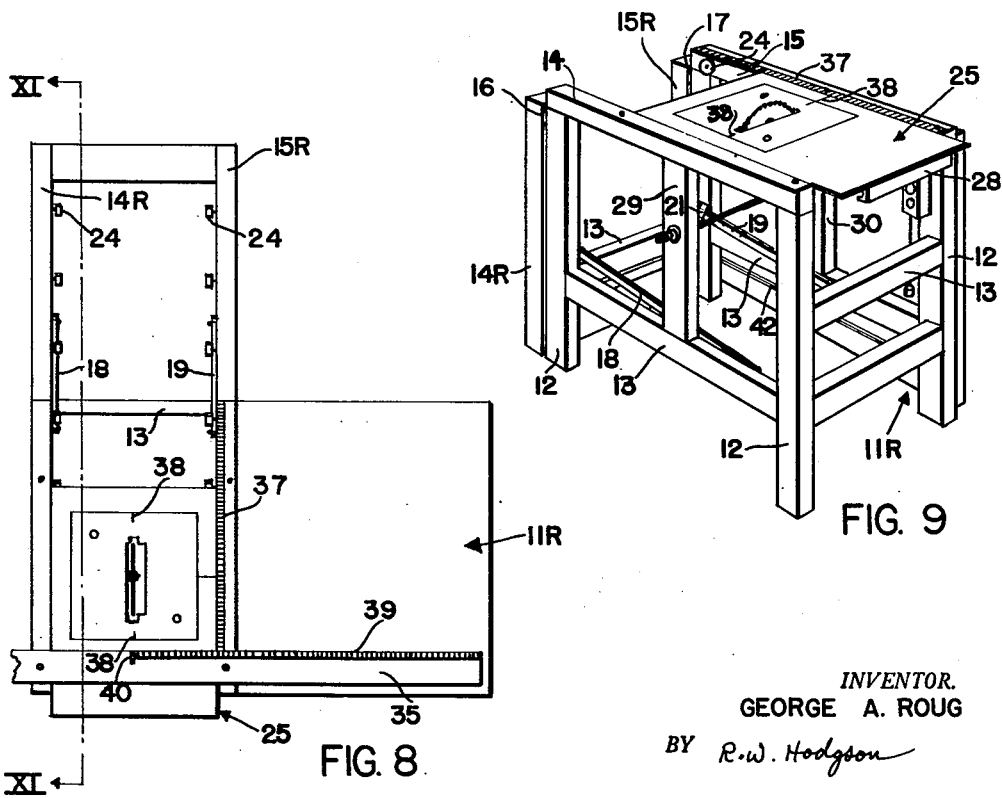
FIG. 8.
FIG. 9
INVENTOR.
GEORGE A. ROUG
BY R.W. Hodgson

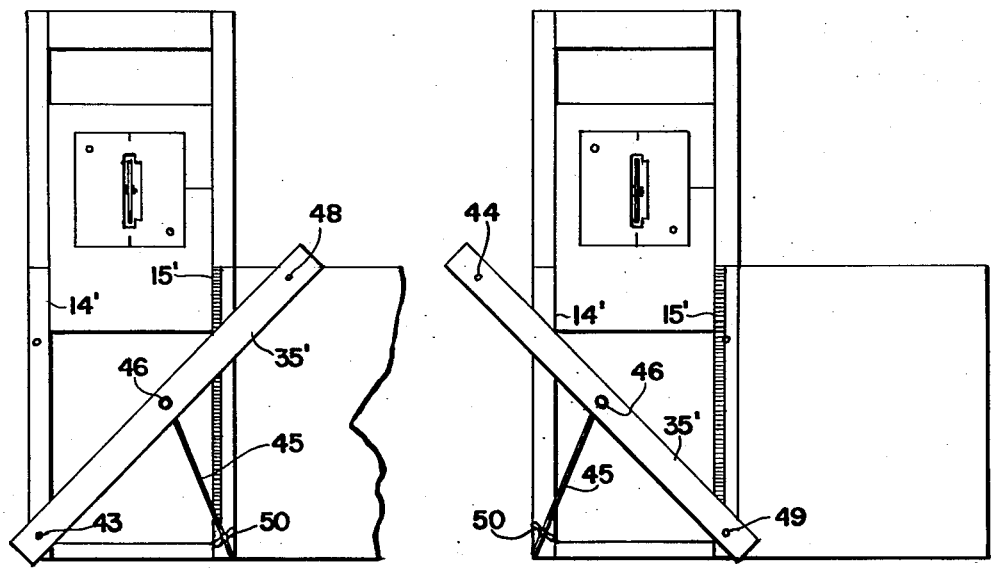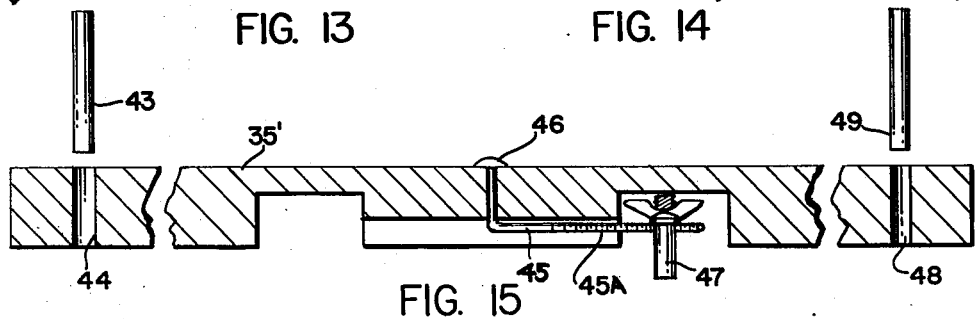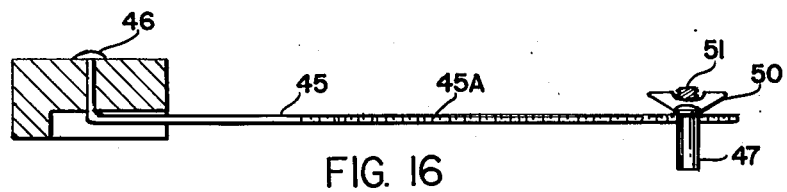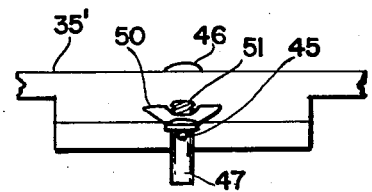
INVENTOR.
GEORGE A. ROUG
BY R. W. Hodgson

United States Patent Office 2,810,412
Patented Oct. 22, 1957

2,810,412

SUPPORTING APPARATUS FOR A PORTABLE ROTARY POWER SAW

George A. Roug, Los Angeles, Calif.

Application December 27, 1955, Serial No. 555,410

10 Claims. (Cl. 143—132)

Generally speaking, the present invention relates to the portable power saw art and, more particularly, pertains to supporting apparatus (usually including a foldable-top table) adapted to removably and selectively mount a portable power saw (usually a portable, hand-operable, rotary type, electric saw) in a substantially inverted position with the saw blade portion thereof in any of several different perpendicularly related positions extending upwardly through a substantially horizontal planar sawing region effectively defined by the surface of said table, whereby to facilitate rip sawing, cross-cut sawing and mitre and/or angular sawing with an ordinary electric hand saw, which customarily would be incapable of performing these operations with such efficiency and dispatch.

In connection with the present invention, it should be noted that carpenters, and the like, when working at a location remote from a shop containing large pre-built power tools, such as when building the ordinary home or residence, or the like, usually employ relatively lightweight portable-type hand tools and a few relatively lightweight portable-type power tools such as rotary electric hand saws, and the like. However, when employing such equipment, it is difficult to accurately rip saw, cross-cut saw and mitre and/or angle saw, because of the lack of adequate guiding and/or supporting fixtures and/or facilities for both the saw and the lumber (which is intended to mean virtually any type of building material normally adapted to be sawed). Therefore, considerable time is lost in producing accurately sawed edges, in such remote operations, with portable power saws. It was this prior art situation which led to the development of applicant's invention.

Generally speaking, applicant's invention may be said to consist of a saw supporting table having a portion (usually a substantially central portion) defining a substantially horizontal planar sawing region, said saw supporting table being cooperable to removably and selectively mount a portable power driven hand saw (usually a portable electric hand saw) of the type having a base plate (usually a substantially rectangular base plate) in inverted position with the upstanding saw blade portion thereof in several (usually four) different perpendicularly related positions extending upwardly through said substantially horizontal planar sawing region. The invention may include a pair of transversely spaced longitudinal parallel guide rails carried by the saw supporting table on each side of the region defining the substantially horizontal planar sawing region. The invention may also include a movable substantially flat platform slidably mountable between said parallel guide rails and slidably engageable therewith along corresponding longitudinal engaging regions for longitudinal sliding movement therealong. One preferred form of the present invention may also include anti-friction roller means effectively positioned in said longitudinal engaging regions to expedite said longitudinal sliding movement. The movable platform may have a saw carriage receiving vertically directed aperture therein. The invention may also include a substantially flat saw carriage removably and selectively engageable with the saw carriage receiving aperture in the platform in substantially inverted position with the saw blade of a portable power-driven hand saw projecting upwardly therefrom in any of several (usually four) different perpendicularly related positions extending upwardly through said substantially horizontal planar sawing region immediately above said flat platform and said guide rails. The invention may include keying means effectively keying and locking said saw carriage in said saw carriage receiving aperture in any of said different perpendicularly related positions. The saw carriage may be provided with a saw blade receiving slot (usually substantially centrally located), a projecting engaging lip means cooperable to removably receive and hold at least one edge of a portable power-driven hand saw base plate, and a selectively engageable fastening means (in certain forms, a selectively engageable laterally spring-biased catch) cooperable to removably hold another edge of said portable hand saw base plate whereby to removably mount said saw with respect to said saw carriage with the saw blade extending through said slot. In one preferred form of the present invention, transverse sawing guide means may be effectively carried by the table adjacent one end thereof and extending across the longitudinal guide rails whereby to guide lumber therealong while sawing same with said saw blade of said portable power-driven hand saw. In one form, said transverse sawing guide means may extend perpendicularly transversely across the longitudinal guide rails whereby to guide lumber being moved perpendicularly transversely across said guide rails while sawing same in a direction substantially perpendicular with respect to said guide rails. In another form, said transverse sawing guide means may be adjustably mounted with respect to the table for extending across the longitudinal guide rails in angularly adjustable relationship with respect thereto whereby to guide lumber therealong while sawing same with said saw blade of said portable power-driven hand saw. In one preferred form of the present invention, transverse scale means may be effectively carried by the table (this may be on the transverse guide means or otherwise) in a direction extending perpendicularly transversely across the longitudinal guide rails adjacent one end of the table to facilitate measuring the length of a piece of lumber being crosscut by moving the platform along the guide rails toward said end of said table and thus cross-cutting said lumber with said saw blade of said portable power-driven hand saw. In one preferred form of the present invention, longitudinal measuring scale means may be effectively carried by the table in a direction extending substantially parallel to the longitudinal guide rails, and at one side of the table, to facilitate measuring the width of a piece of lumber being rip sawed by moving same perpendicularly transversely across said guide rails while sawing same with said saw blade of said portable power-driven hand saw. One preferred form of the present invention may include platform immobilizing means consisting of vise means effectively engaging the guide rails and selectively inwardly squeezingly operable to lock the platform between said guide rails and selectively outwardly releaseably operable to effectively release said platform for longitudinal movement.

It should be noted that, in one specific preferred form of the present invention, the above-referred to saw carriage receiving aperture may be substantially square and provided with inwardly extending supporting prongs. In this embodiment of the invention, the saw carriage may also be of similar square, plate-like configuration removably and selectively engageable with the corresponding square saw carriage receiving aperture and the supporting prongs in substantially inverted position with the saw blade projecting upwardly therefrom in any of four different perpendicularly related positions extending upwardly through said substantially horizontal planar sawing region immediately above said flat platform and said guide rails. In this preferred embodiment, the mating square corners of said saw carriage receiving aperture and said saw carriage comprise the above-mentioned keying means and act to effectively key and lock said saw carriage in said saw carriage receiving aperture in any of said four different perpendicularly related positions.

It should be noted that the present invention is directed to the combination of a portable power-driven hand saw of the type having a base plate (usually substantially rectangular) and a saw table in accordance with the general description set forth above, in addition to being directed to such a saw table per se.

It should also be noted that the present invention includes a subcombination of the above comprising the combination of a portable power-driven hand saw having a base plate (usually substantially rectangular) and a saw carriage for removably mounting said portable electric hand saw, said saw carriage being provided with a saw blade receiving slot (usually substantially centrally located), a projecting engaging lip means cooperable to removably receive and hold at least one edge of a portable power-driven hand saw base plate, and a selectively engageable laterally spring biased catch cooperable to removably hold another edge of said portable power-driven hand saw base plate whereby to removably mount said portable power-driven hand saw with respect to said saw carriage with the saw blade extending through said slot.

From the above description of basic and preferred generic forms of the present invention, it will be apparent to those skilled in the art that virtually all of the prior art problems and/or disadvantages hereinbefore briefly and generally referred to, are substantially completely eliminated and/or overcome in and through the use of the present invention.

For example, it is obvious that the saw table of the present invention (particularly in its foldable-top form) comprises a relatively compact and readily portable structure which may easily be transported to a remote work location and set up for operation at such location.

Furthermore, it is obvious that the saw table of the present invention mounts the customary type of portable electric hand saw in a manner making it capable of very precise sawing operations, whether rip sawing, cross-cut sawing, or mitre (and/or angle) sawing, in a manner heretofore substantially impossible of attainment with such portable electric hand saws.

With the above points in mind, it is an object of the present invention to provide a saw supporting table (usually a foldable-top table) adapted to removably and selectively directionally mount a portable power-driven saw (usually a portable electric hand saw) in a manner making it capable of extremely precise sawing work.

It is a further object of the present invention to provide the combination of a saw suporting table of the type set forth in the preceding object and a portable power-driven saw (usually a portable electric hand saw).

It is a further object of the present invention to provide, as a subcombination of the above, the combination of a portable power-driven saw (usually a portable electric hand saw) having a base plate (usually a substantially rectangular base plate) and a saw carriage of the type set forth hereinabove in the generic description of this subcombination.

Other and allied objects will be apparent to those skilled in the art after a careful perusal, examination and study of the accompanying illustrations, the present specification, and the appended claims.

To facilitate understanding, reference will be made to the hereinbelow described drawings, in which:

Fig. 3 is a reduced-size perspective view showing the saw carriage and mounted electric hand saw of Fig. 1 after having been inverted into the normal mounting position for mounting with respect to the saw table;

Fig. 4 is a perspective view of the movable substantially flat platform showing it in one specific form wherein the saw carriage receiving aperture therein is square and is provided with inwardly extending supporting prongs;

Fig. 5 is a top plan view of the saw carriage of Fig. 3 (carrying the electric hand saw, of course) when mounted in the corresponding square aperture in the movable platform shown in Fig. 4 in the relative orientations shown in Figs. 3 and 4—usually, this position is for cross-cut sawing purposes;

Fig. 6 is a top plan view, of aspect similar to Fig. 5 but shows the saw carriage rotated 90 degrees (in counterclockwise direction) and re-engaged and keyed with respect to the movable platform—usually, this position is for rip sawing purposes;

Fig. 7 is a perspective view of one illustrative embodiment of a saw table shown mounting the assembled platform, saw carriage, and electric hand saw of Fig. 6 with respect thereto and what is customarily rip sawing position;

Fig. 8 is a top plan view of the table shown in Fig. 7 but shows the saw carriage rotated 90 degrees (in counterclockwise direction) from the position shown in Fig. 7 into what is customarily cross-cut sawing position;

Fig. 9 is a perspective view of aspect similar to Fig. 7 but shows the rear portion of the table top and the right portion of the table top in folded relationship with respect to the rest of the appartus, and also shows the transverse sawing guide means of Fig. 7 removed;

Fig. 13 is a fragmentary top plan view, of aspect similar to Fig. 8, but illustrating a slightly modified form of sawing guide means, which is effectively angularly adjustable for producing desired angle cuts when used to guide lumber with respect to the saw blade;

Fig. 14 is a top plan view, of aspect similar to Fig. 13, but showing the sawing guide means of Fig. 13 arranged for use in producing a substantially different angle cut;

Fig. 15 is an enlarged longitudinal sectional view of the modified sawing guide means of Figs. 13 and 14 with portions thereof broken away and with engaging pins exploded;

Fig. 16 is a cross-sectional view of the main transverse member of the sawing guide means of Fig. 15 with the pivotal arm extending therefrom shown in side elevation;

Fig. 17 is a fragmentary right end elevational view of Fig. 16;

Fig. 19 (sheet 2) is a perspective view showing the modified saw carriage of Fig. 18 mounted on an auxiliary support other than the saw table of the present invention—in this particular case, comprising a saw horse;

Fig. 21 (sheet 2) is a top plan view of the modified saw carriage of Fig. 20 mounted in (and keyed with respect to) the movable platform in rip sawing position; and Fig. 22 (sheet 2) is an enlarged sectional view of the keying means of Fig. 21 taken in the direction of the arrows XXII—XXII in Fig. 21.

Figure 1:
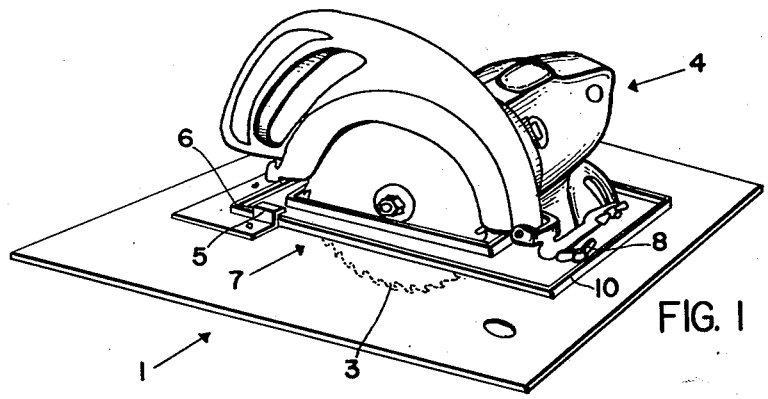
Fig. 1 is a perspective view of a saw carriage of substantially flat, square, plate-like configuration shown mounting a portable electric hand saw—the entire device being in inverted position from that normally assumed when the device is mounted with respect to a saw table.

Referring specifically to the figures, the saw carriage, hereinbefore generically referred to, is shown in a specific square plate-like form, as indicated generally at 1, and has a saw blade receiving slot 2 therein (usually centrally located), which, in the specific square saw carriage configuration illustrated, is substantially parallel to two of the sides of the saw carriage 1 and is substantially perpendicular to the other two sides thereof. The slot 2 is adapted to allow the saw blade 3 of the portable electric hand saw, indicated generally 4, to extend therethrough, as indicated by the dotted lines in Fig. 1. The saw carriage 1 is also provided with a projecting engaging lip means 5 cooperable to removably receive and hold the end 6 of the substantially rectangular saw base plate, indicated generally at 7. The saw carriage 1 is also provided with selectively engageable fastening means (in this specific example illustrated, the wing screw 8 and tapped aperture 9 in the saw carriage 1) cooperable to removably hold (by passing through an aperture in the base plate 7) the opposite edge 10 of said base plate 7, whereby to removably mount the portable electric hand saw 4 with respect to said saw carriage 1 with the saw blade 3 extending through the slot 2.

The present invention may also include a table (usually a foldable-top table) having a portion (usually a substantially central portion) defining a substantially horizontal planar sawing region, said saw supporting table being cooperable to removably and selectively mount a portable power-driven hand saw (usually a portable electric hand saw) of the type having a base plate (usually a substantially rectangular base plate) in inverted position with the upstanding saw blade portion thereof in any of several different perpendicularly related positions extending upwardly through said substantially horizontal planar sawing region. Said table may include a pair of transversely spaced longitudinal parallel guide rails carried thereby on each side of said portion defining said substantially horizontal planar sawing region.

The saw supporting table, hereinbefore generically referred to, is shown in a specific foldable-top form, indicated generally at 11, Figs. 7 to 12, and is shown as including four fixed legs 12 and interconnecting members 13—all effectively supporting the transversely spaced longitudinal parallel guide rails 14 and 15 which effectively define therebetween and along the top surfaces thereof a horizontal planar sawing region. In the specific example illustrated, the rear ends (specifically indicated by reference numbers 14R and 15R) of the guide rails 14 and 15 are foldably mounted by hinges 16 and 17 for corresponding longitudinal alignment as shown in Figs. 7, 8, 10, 11, and 12 or for downward folding with respect thereto as shown in Fig. 9. Supporting struts 18 and 19 are pivotally fastened to the corresponding rear guide rail extensions 14R and 15R and extend downwardly into and through corresponding guide straps 20 and 21 for selective locking and unlocking engagement with respect to corresponding pins 22 and 23, whereby to make it possible to support the rear guide rail extensions 14R and 15R in the extended relationship shown in Figs. 7, 8, 10, 11 and 12 and also whereby to make it possible to fold said rear guide rail extensions 14R and 15R downwardly into the position shown in Fig. 9.

The anti-friction roller means, hereinbefore generically referred to, is shown, in the specific form of the invention illustrated in the drawings, as comprising a plurality of inwardly directed anti-friction rollers 24 carried by the inner sides of the guide rails 14 and 15 (which shall also mean their rearward extensions 14R and 15R).

The movable substantially flat platform, hereinbefore generically referred to, in the specific form illustrated, takes the form of a substantially rectangular platform, indicated generally at 25, having a substantially square saw carriage receiving aperture 26 of substantially the same size and shape as the saw carriage 1, and also provided with inwardly extending supporting prongs 27. This is best shown in Fig. 4. The saw carriage 1 (including the saw 4 carried thereby) is adapted to be moved from the position shown in Fig. 1 into the position shown in Fig. 3 and then moved downwardly into the aperture 26 resting on the prongs 27 so as to produce an assembled structure substantially as shown in Fig. 5 with the saw blade 3 in inverted position projecting upwardly therefrom and capable of being readjusted by repositioning and re-keying the carriage 1 with respect to the platform 25 whereby to cause the saw blade 3 to lie in any of four different perpendicularly related upwardly projecting positions. Incidentally, it should be noted that the mating square corners of the saw carriage receiving aperture 26 and the saw carriage 1 comprise keying means effectively keying and locking the saw carriage 1 in said saw carriage receiving aperture 26 in any of said four different perpendicularly related positions.

The movable platform 25 is adapted to be slidably mountable between the parallel guide rails 14 and 15 on the rollers 24 for longitudinal sliding movement therealong from the rear end of the table to the front end of the table and vice versa. This longitudinal sliding movement of the platform 25 may be facilitated by the hand-grip member 28 lying under the front edge of the platform 25. This operation is usually employed when cross-cut sawing is to be done and when the saw blade 3 lies in the position shown in Figs. 5 and 8 (or, in certain cases, the exact opposite thereof).

The platform immobilizing means, hereinbefore generically referred to, is shown, in the specific form illustrated, as comprising a vise effectively including the transversely spaced upstanding table frame (or vise) members 29 and 30 and a manually rotatable shaft member 31 rotatably mounted with respect to a bearing 32 in one of said upstanding vise members and threadably mounted with respect to a threaded fitting 33 carried by the other of said upstanding vise members, whereby rotation of the crank handle 34 in one direction will inwardly squeezingly move the upstanding vise members 29 and 30 and the longitudinal guide rails 14 and 15 engaged thereby, thus causing the platform 25 to become locked in a fixed position between said guide rails 14 and 15. This is normally done when the device is to be used for rip sawing. In such case, the platform 25 is normally moved into the approximate position shown in Fig. 7 (or, in certain cases, the exact opposite thereof) and is locked for the subsequent rip sawing operation. However, when desired, the crank handle 34 may be rotated in the opposite direction to outwardly releasably move the upstanding vise members 29 and 30, thereby allowing the guide rails 14 and 15 to move outwardly slightly and release the platform 25 for free longitudinal movement, such as for cross-cutting by longitudinally moving said platform 25 by means of the hand-grip 28 when the saw blade 3 is in the position shown in Fig. 8 (or, in certain cases, the exact opposite thereof).

The transverse sawing guide means hereinbefore generically referred to in the specific example illustrated in Figs. 7, 8, 10 and 11 takes the form of a transverse member or board 35 removably mountable transversely across the front end of the table and across the guide rails 14 and 15 by means of two pins or bolts 36 which are adapted to drop into corresponding holes in the tops of the front ends of the guide rails 14 and 15. The arrangement is such that the length of lumber being rip sawed can be slidably moved transversely across the guide rails 14 and 15, while against the inner edge of the sawing guide member 35, in a direction generally from left to right as shown in Fig. 7 whereby to rip saw the lumber in accordance with the width measurement determined by longitudinal measuring scale 37 and markers 38 carried by the upper surface of the carriage 1 and platform 25. This is done, of course, while the platform is locked between the guide rails 14 and 15 by the hereinbefore described platform immobilizing vise. Incidentally, it should be noted that, in the specific example illustrated, a transverse scale 39 effectively extends across the guide rails 14 and 15 and, in this particular version, is carried by the transverse sawing guide 35. This transverse scale 39 may be employed for measuring the length of lumber cut during a cross-cut sawing operation performed when the platform 25 is free for longitudinal movement and the saw blade 3 is in cross-cut position such as shown in Fig. 8 (or, in certain cases the exact opposite thereof) by aligning the marker 38 on the carriage 1 with the marker slot 40 at the left end of the transverse scale 39.

It should be noted that the table 11 is provided with a rightwardly directed etxension 11R thereof which is hinged, as indicated at 41, and which is provided with pivotally collapsible leg means 42. This extension (which may also be duplicated on the left side of the table if desired) is to facilitate the positioning and movement of relatively long pieces of lumber or relatively large sheets of plywood, or the like, during sawing operations. Said right table top extension 11R is shown in upstanding position in Figs. 7, 8, 10 and 12 and is shown in collapsed position in Fig. 9.

Figs. 13 to 17 illustrate a slight modification of the sawing guide means 35 shown in Figs. 7, 8, 10 and 11. In this modification, the sawing guide means 35' is angularly adjustable with respect to the longitudinal guide rails 14' and 15' to facilitate angular sawing operations. As shown in Fig. 13, the sawing guide member 35 is provided with a pin 43 at its left end adapted to extend through the aperture 44 therein downwardly into a corresponding hole in the top of the front end of the left guide rail 14' while a central pivotal arm 45 (which is centrally pivotally attached at 46) extends angularly to the right front corner of the right guide rail 15' and is selectively pivotally attached with respect thereto by pivot pin 47. The aperture 48 at the right end of the sawing guide 35' and the corresponding pin 49 are not used for fastening purposes in the arrangement shown in Fig. 13. It will be understood, from consideration of the above and from examination of Fig. 13, that the angular relationship of the sawing guide member 35' with respect to the two guide rails 14' and 15' is determined by the length of the pivotal arm 45 between the pivot 46 and the pivot point 47. Therefore, this length is selectively adjustable in order to change said angular relationship. This is accomplished by disengaging the wing nut 50 from the threaded shaft 51 at the top of the pivot pin 47 and longitudinally moving the pivot pin 47, wing nut 50 and threaded shaft 51 along the arm 45 to a desired position (as shown by the angle-indicating scale 45A on arm 45) and then re-engaging the wing nut 50 with the threaded shaft 51 so as to lock same in said selected desired fixed position on the arm 45 corresponding to a given angular relationship. When it is desired to saw at a reverse angle from that shown in Fig. 13, the pivot pin 43 is removed and the left end of the sawing guide 35' is moved into the position shown in Fig. 14. Also the pivot pin 47 is moved into the position formerly occupied by the pivot pin 43 at the top of the front end of the left guide rail 14', and the pivot pin 49 is inserted through the aperture 48 in the right end of the sawing guide 35' and is moved into the position formerly occupied by the pivot pin 47 at the top of the front end of the right guide rail 15'. Angular adjustment may be produced as hereinbefore described in connection with Fig. 13.

Figure 2:
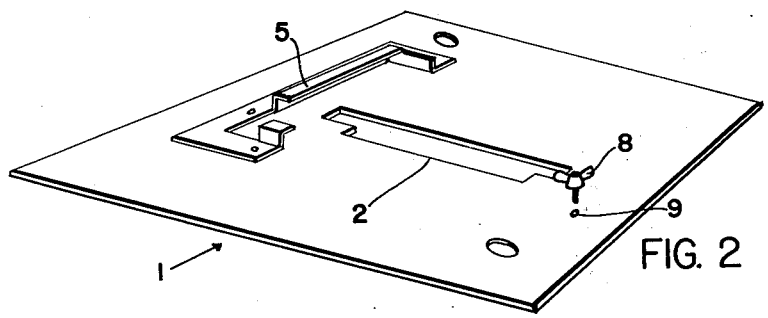
Fig. 2 is a perspective view, of aspect similar to Fig. 1, but with the portable electric hand saw removed and with the selectively engageable fastening means (in this illustration, a wing screw) shown in exploded and disengaged relationship.
Figure 18:
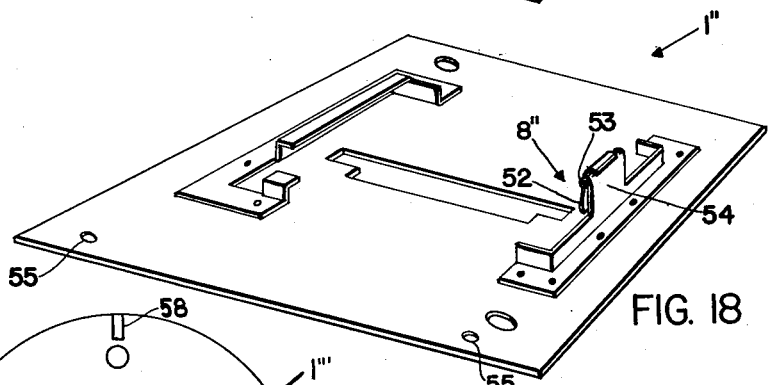
Fig. 18 (sheet 1) is a view, of aspect similar to Fig. 2, but shows a slightly modified form of saw carriage wherein the selectively engageable fastening means (the wing screw in Fig. 2) is modified to take the form of a selectively engageable laterally spring biased catch.

Fig. 18 illustrates a very slight modification of the selectively engageable fastening means (the wing nut 8 and tapped aperture 9 of Fig. 2) wherein a laterally spring biased catch member 8'' is adapted to resiliently snap over and engage the righthand end of the saw plate (such as the saw base plate right end 10 shown in Fig. 1), whereby to facilitate rapid engagement and disengagement of the saw base plate with respect to the saw carriage 1''. It should be understood that the laterally resiliently biased catch 8'' includes a pivotally movable catch member 52 pivoted on an axis at 53 with respect to an upstanding fixed bracket member 54 carried by the saw carriage plate 1''. Furthermore, it should be understood that adjacent the pivotal junction 53, suitable interior biasing spring means cooperates with the movable catch member 52 and the fixed bracket member 54 to normally spring bias the bottom end of the movable catch member 52 toward the left as viewed in Fig. 18 for saw base plate engaging purposes. Incidentally, it should be noted that in the specific example illustrated in Fig. 18, the saw carriage plate 1'' is provided with fastening holes 55 adapted for use in mounting the entire device by threaded fastening means 56 with respect to an auxiliary support other than the saw table of the present invention. This is shown in Fig. 19, wherein said auxiliary support takes the form of a saw horse 57.

Figure 20:
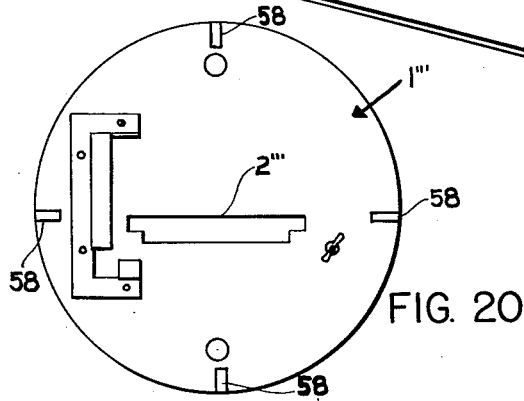
Fig. 20 (sheet 1) is a top plan view of a modified form of saw carriage wherein the keying means comprises a spring biased lever cooperable with any of four corresponding keying slots or recesses.
Figure 10:
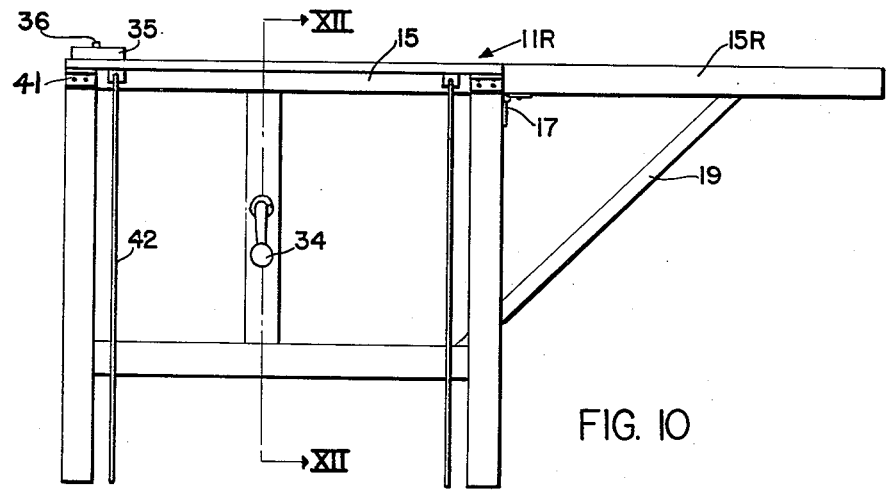
Fig. 10 is an elevational view from the right rear of Fig. 7—with the movable platform, saw carriage and saw removed, however.
Figure 11:
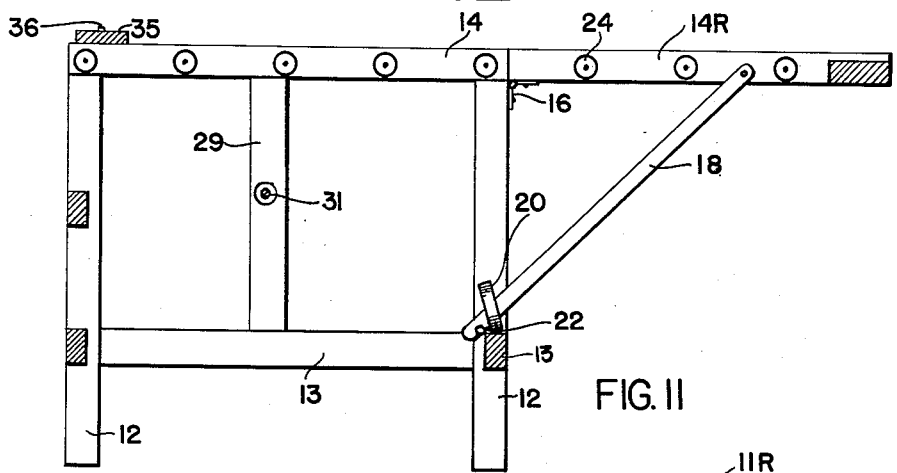
Fig. 11 is a longitudinal vertical sectional view of the saw table of Fig. 7 with the movable platform, saw carriage and saw removed, and is of aspect similar to Fig. 10 (as indicated by the arrows XI—XI in Fig. 8)
Figure 12:
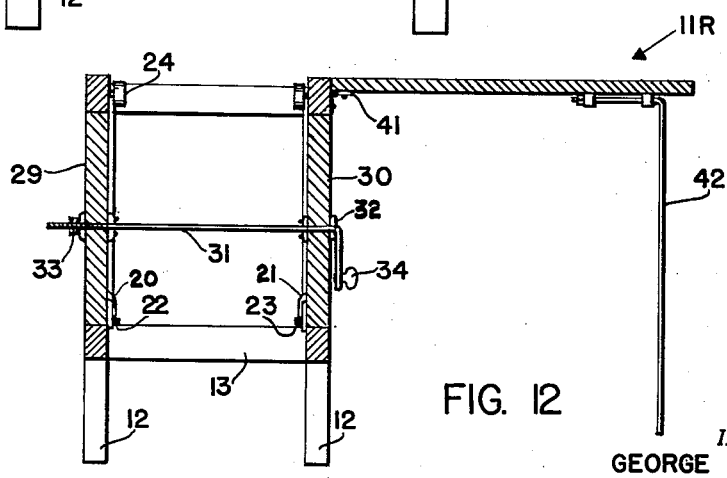
Fig. 12 is a vertical sectional view of the saw table of Fig. 7 with the movable platform, saw carriage and saw removed, and is taken in the direction indicated by the arrows XII—XII in Fig. 10.

Figs. 20, 21 and 22 illustrate a slight modification of the saw carriage and movable platform—also the means for selectively relatively keying same in any of the four different saw blade positions. In this modification, the saw carriage plate 1''' and the corresponding aperture in the platform 25''' are of similar circular configuration rather than square, and the keying means comprises radial, circumferentially spaced recesses 58 at four 90-degree displaced positions on the underside of the saw carriage 1''', which cooperate with a locking lever 59 spring biased by spring 60 and pivotally carried on the underneath side of the platform 25''' for engagement with any of said recesses 58. It should be noted that the spring biased locking lever 59 will normally automatically engage and lock with respect to any of the recesses 58 which comes into alignment therewith. However, a digital access opening 61 is provided in the platform 25''' to allow the locking lever 59 to be digitally disengaged when the operator desires to rotate the carriage 1''' with respect to the platform 25''' into a new locking position.

It should be noted that this application is a continuation-in-part of my copending application entitled Electric Hand Saw Fixture; Serial No. 462,439; filed October 15, 1954, and abandoned.

Numerous modifications and variations of the present invention will occur to those skilled in the art after a careful study hereof. All such, properly within the basic spirit and scope of the present invention are intended to be included and comprehended herein as fully as if specifically described, illustrated and claimed herein.

The exact compositions, configurations, constructions, relative positionings, and cooperative relationships of the various component parts of the present invention are not critical, and can be modified substantially within the spirit of the present invention.

The embodiments of the present invention specifically described and illustrated herein are exemplary only, and are not intended to limit the scope of the present invention, which is to be interpreted in the light of the prior art and the appended claims only, with due consideration for the doctrine of equivalents.

I claim:

1. A saw supporting table having a portion defining a substantially horizontal planar sawing region, said saw supporting table being cooperable to removably and selectively mount a portable power-driven hand saw of the type having a base plate in inverted position with the upstanding saw blade portion thereof in any of several different perpendicularly related positions extending upwardly through said substantially horizontal planar sawing region, comprising: a pair of transversely spaced longitudinal parallel guide rails carried by said saw supporting table on each side of said portion defining said substantially horizontal planar sawing region; a movable substantially flat platform slidably mountable between said parallel guide rails and slidably engageable therewith along corresponding longitudinal engaging regions for longitudinal sliding movement therealong; said platform having a saw carriage receiving vertically directed aperture therein; a substantially flat saw carriage removably and selectively engageable with the saw carriage receiving aperture in the platform in substantially inverted position with the saw blade of a portable hand saw projecting upwardly therefrom in any of several different perpendicularly related positions extending upwardly through said substantially horizontal planar sawing region immediately above said flat platform and said guide rails; keying means effectively keying and locking said saw carriage in said saw carriage receiving aperture in any of said different perpendicularly related positions; said saw carriage being provided with a saw blade receiving slot, a projecting engaging lip means cooperable to removably receive and hold at least one edge of a portable hand saw base plate, and a selectively engageable fastening means cooperable to removably hold another edge of said portable hand saw base plate whereby to removably mount said portable hand saw with respect to said saw carriage with the saw blade extending through said slot; and platform immobilizing means consisting of vise means engaging the guide rails and selectively inwardly squeezingly operable to lock the platform between said guide rails and selectively outwardly releasably operable to effectively release said platform for longitudinal movement.

2. A saw supporting table having a portion defining a substantially horizontal planar sawing region, said saw supporting table being cooperable to removably and selectively mount a portable power-driven hand saw of the type having a base plate in inverted position with the upstanding saw blade portion thereof in any of several different perpendicularly related positions extending upwardly through said substantially horizontal planar sawing region, comprising: a pair of transversely spaced longitudinal parallel guide rails carried by said saw supporting table on each side of said portion defining said substantially horizontal planar sawing region; a movable substantially flat platform slidably mountable between said parallel guide rails and slidably engageable therewith along corresponding longitudinal engaging regions for longitudinal sliding movement therealong; antifriction roller means effectively positioned in said longitudinal engaging regions to expedite said longitudinal sliding movement; said platform having a saw carriage receiving vertically directed aperture therein; a substantially flat saw carriage removably and selectively engageable with the saw carriage receiving aperture in the platform in substantially inverted position with the saw blade of a portable hand saw projecting upwardly therefrom in any of several different perpendicularly related positions extending upwardly through said substantially horizontal planar sawing region immediately above said flat platform and said guide rails; keying means effectively keying and locking said saw carriage in said saw carriage receiving aperture in any of said different perpendicularly related positions; said saw carriage being provided with a saw blade receiving slot, a projecting engaging lip means cooperable to removably receive and hold at least one edge of a portable hand saw base plate, and a selectively engageable fastening means cooperable to removably hold another edge of said portable hand saw base plate whereby to removably mount said portable hand saw with respect to said saw carriage with the saw blade extending through said slot; and platform immobilizing means consisting of vise means engaging the guide rails and selectively inwardly squeezingly operable to lock the platform between said guide rails and selectively outwardly releasably operable to effectively release said platform for longitudinal movement.

3. A saw supporting table having a portion defining a substantially horizontal planar sawing region, said saw supporting table being cooperable to removably and selectively mount a portable power-driven hand saw of the type having a base plate in inverted position with the upstanding saw blade portion thereof in any of several different perpendicularly related positions extending upwardly through said substantially horizontal planar sawing region, comprising: a pair of transversely spaced longitudinal parallel guide rails carried by said saw supporting table on each side of said portion defining said substantially horizontal planar sawing region, said parallel guide rails being provided with inwardly directed antifriction roller means; a movable substantially flat platform slidably mountable between said parallel guide rails and slidably engaging said roller means for longitudinal sliding movement therealong; said platform having a saw carriage receiving vertically directed aperture therein; a substantially flat saw carriage removably and selectively engageable with the saw carriage receiving aperture in the platform in substantially inverted position with the saw blade of a portable hand saw projecting upwardly therefrom in any of several different perpendicularly related positions extending upwardly through said substantially horizontal planar sawing region immediately above said flat platform and said guide rails; keying means effectively keying and locking said saw carriage in said saw carriage receiving aperture in any of said different perpendicularly related positions; said saw carriage being provided with a saw blade receiving slot, a projecting engaging lip means cooperable to removably receive and hold at least one edge of a portable electrical hand saw base plate, and a selectively engageable laterally spring biased catch cooperable to removably hold another edge of said portable electrical hand saw base plate whereby to removably mount said portable electric hand saw with respect to said saw carriage with the saw blade extending through said slot; and platform immobilizing means consisting of vise means engaging the guide rails and selectively inwardly squeezingly operable to lock the platform between said guide rails and selectively outwardly releasably operable to effectively release said platform for longitudinal movement.

4. A saw supporting table having a portion defining a substantially horizontal planar sawing region, said saw supporting table being cooperable to removably and selectively mount a portable power-driven hand saw of the type having a base plate in inverted position with the upstanding saw blade portion thereof in any of several different perpendicularly related positions extending upwardly through said substantially horizontal planar sawing region, comprising: a pair of transversely spaced longitudinal parallel guide rails carried by said saw supporting table on each side of said portion defining said substantially horizontal planar sawing region, said parallel guide rails being provided with inwardly directed antifriction roller means; a movable substantially flat platform slidably mountable between said parallel guide rails and slidably engaging said roller means for longitudinal sliding movement therealong; said platform having a substantially square saw carriage receiving vertically directed aperture therein provided with inwardly extending supporting prongs; a substantially flat square saw carriage of plat-like configuration removably and selectively engageable with the corresponding square saw carriage receiving aperture and supporting prongs in substantially inverted position with the saw blade of a portable hand saw projecting upwardly therefrom in any of four different perpendicularly related positions extending upwardly through said substantially horizontal planar sawing region immediately above said flat platform and said guide rails; the mating square corners of said saw carriage receiving aperture and said saw carriage comprising keying means effectively keying and locking said saw carriage in said saw carriage receiving aperture in any of said four different perpendicularly related positions; said square saw carriage being provided with a saw blade receiving slot substantially parallel to two sides thereof and substantially perpendicular to the other two sides thereof, a projecting engaging lip means cooperable to removably receive and hold at least one edge of a portable hand saw base plate, and a selectively engageable laterally spring biased catch cooperable to removably hold another edge of said portable hand saw base plate whereby to removably mount said portable hand saw with respect to said saw carriage with the saw blade extending through said slot; and platform immobilizing means consisting of vise means engaging the guide rails and selectively inwardly squeezingly operable to lock the platform between said guide rails and selectively outwardly releasably operable to effectively release said platform for longitudinal movement.

5. A saw supporting table having a portion defining a substantially horizontal planar sawing region, said saw supporting table being cooperable to removably and selectively mount a portable power-driven hand saw of the type having a base plate in inverted position with the upstanding saw blade portion thereof in any of several different perpendicularly related positions extending upwardly through said substantially horizontal planar sawing region, comprising: a pair of transversely spaced longitudinal parallel guide rails carried by said saw supporting table on each side of said portion defining said substantially horizontal planar sawing region, said parallel guide rails being provided with inwardly directed anti-friction roller means; a movable substantially flat platform slidably mountable between said parallel guide rails and slidably engaging said roller means for longitudinal sliding movement therealong; said platform having a saw carriage receiving vertically directed aperture therein; a substantially flat saw carriage removably and selectively engageable with the saw carriage receiving aperture in the platform in substantially inverted position with the saw blade of a portable hand saw projecting upwardly therefrom in any of several different perpendicularly related positions extending upwardly through said substantially horizontal planar sawing region immediately above said flat platform and said guide rails; keying means effectively keying and locking said saw carriage in said saw carriage receiving aperture in any of said different perpendicularly related positions; said saw carriage being provided with a saw blade receiving slot, a projecting engaging lip means cooperable to removably receive and hold at least one edge of a portable electrical hand saw base plate, and a selectively engageable laterally spring biased catch cooperable to removably hold another edge of said portable electrical hand saw base plate whereby to removably mount said portable electric hand saw with respect to said saw carriage with the saw blade extending through said slot; transverse sawing guide means carried by the table in a direction extending across the longitudinal guide rails adjacent one end of the table whereby to guide lumber therealong while sawing same with said saw blade of said portable hand saw; transverse measuring scale means effectively carried by the table in a direction extending perpendicularly transversely across the longitudinal guide rails at one end of the table to facilitate measuring the length of a piece of lumber being cross cut by moving the platform along the guide rails toward said end of the table and thus cross cutting said lumber with said saw blade of said portable hand saw; longitudinal measuring scale means effectively carried by the table in a direction extending substantially parallel to the longitudinal guide rails at one side of the table to facilitate measuring the width of a piece of lumber being rip sawed by moving same perpendicularly transversely across said guide rails while sawing same with said saw blade of said portable hand saw; and platform immobilizing means consisting of vise means engaging the guide rails and selectively inwardly squeezingly operable to lock the platform between said guide rails and selectively outwardly releasably operable to effectively release said platform for longitudinal movement.

6. A saw supporting table having a portion defining a substantially horizontal planar sawing region, said saw supporting table being cooperable to removably and selectively mount a portable power-driven hand saw of the type having a base plate in inverted position with the upstanding saw blade portion thereof in any of several different perpendicularly related positions extending upwardly through said substantially horizontal planar sawing region, comprising: a pair of transversely spaced longitudinal parallel guide rails carried by said saw supporting table on each side of said portion defining said substantially horizontal planar sawing region, said parallel guide rails being provided with inwardly directed anti-friction roller means; a movable substantially flat platform slidably mountable between said parallel guide rails and slidably engaging said roller means for longitudinal sliding movement therealong; said platform having a saw carriage receiving vertically directed aperture therein; a substantially flat saw carriage removably and selectively engageable with the saw carriage receiving aperture in the platform in substantially inverted position with the saw blade of a portable hand saw projecting upwardly therefrom in any of several different perpendicularly related positions extending upwardly through said substantially horizontal planar sawing region immediately above said flat platform and said guide rails; keying means effectively keying and locking said saw carriage in said saw carriage receiving aperture in any of said different perpendicularly related positions; said saw carriage being provided with a saw blade receiving slot, a projecting engaging lip means cooperable to removably receive and hold at least one edge of a portable electrical hand saw base plate, and a selectively engageable laterally spring biased catch cooperable to removably hold another edge of said portable electrical hand saw base plate whereby to removably mount said portable electric hand saw with respect to said saw carriage with the saw blade extending through said slot; transverse sawing guide means carried by the table in a direction extending perpendicularly transversely across the longitudinal guide rails at one end of the table whereby to guide lumber being moved perpendicularly transversely across said guide rails while sawing same with said saw blade of said portable electric hand saw; transverse measuring scale means effectively carried by said transverse sawing guide extending perpendicularly transversely across the longitudinal guide rails at one end of the table to facilitate measuring the length of a piece of lumber being cross cut by moving the platform along the guide rails toward said end of the table and thus cross cutting said lumber with said saw blade of said portable hand saw; longitudinal measuring scale means effectively carried by the table in a direction extending substantially parallel to the longitudinal guide rails at one side of the table to facilitate measuring the width of a piece of lumber being rip sawed by moving same perpendicularly transversely across said guide rails while sawing same with said saw blade of said portable hand saw; and platform immobilizing means consisting of vise means engaging the guide rails and selectively inwardly squeezingly operable to lock the platform between said guide rails and selectively outwardly releasably operable to effectively release said platform for longitudinal movement.

7. A saw supporting table having a portion defining a substantially horizontal planar sawing region, said saw supporting table being cooperable to removably and selectively mount a portable power-driven hand saw of the type having a base plate in inverted position with the upstanding saw blade portion thereof in any of several different perpendicularly related positions extending upwardly through said substantially horizontal planar sawing region, comprising: a pair of transversely spaced longitudinal parallel guide rails carried by said saw supporting table on each side of said portion defining said substantially horizontal planar sawing region, said parallel guide rails being provided with inwardly directed anti-friction roller means; a movable substantially flat platform slidably mountable between said parallel guide rails and slidably engaging said roller means for longitudinal sliding movement therealong; said platform having a saw carriage receiving vertically directed aperture therein; a substantially flat saw carriage removably and selectively engageable with the saw carriage receiving aperture in the platform in substantially inverted position with the saw blade of a portable hand saw projecting upwardly therefrom in any of several different perpendicularly related positions extending upwardly through said substantially horizontal planar sawing region immediately above said flat platform and said guide rails; keying means effectively keying and locking said saw carriage in said saw carriage receiving aperture in any of said different perpendicularly related positions; said saw carriage being provided with a saw blade receiving slot, a projecting engaging lip means cooperable to removably receive and hold at least one edge of a portable electrical hand saw base plate, and a selectively engageable laterally spring biased catch cooperable to removably hold another edge of said portable electrical hand saw base plate whereby to removably mount said portable electric hand saw with respect to said saw carriage with the saw blade extending through said slot; transverse sawing guide means carried by the table in an adjustable direction extending across the longitudinal guide rails adjacent one end of the table whereby to guide lumber therealong while sawing same with said saw blade of said portable hand saw; transverse measuring scale means effectively carried by said transverse sawing guide extending perpendicularly transversely across the longitudinal guide rails at one end of the table to facilitate measureing the length of a piece of lumber being cross cut by moving the platform along the guide rails toward said end of the table and thus cross cutting said lumber with said saw blade of said portable hand saw; longitudinal measuring scale means effectively carried by the table in a direction extending substantially parallel to the longitudinal guide rails at one side of the table to facilitate measuring the width of a piece of lumber being rip sawed by moving same perpendicularly transversely across said guide rails while sawing same with said saw blade of said portable hand saw; and platform immobilizing means consisting of vise means engaging the guide rails and selectively inwardly squeezingly operable to lock the platform between said guide rails and selectively outwardly releaseably operable to effectively release said platform for longitudinal movement.

8. A saw supporting table having a portion defining a substantially horizontal planar sawing region, said saw supporting table being cooperable to removably and selectively mount a portable power-driven hand saw of the type having a base plate in inverted position with the upstanding saw blade portion thereof in any of several different perpendicularly related positions extending upwardly through said substantially horizontal planar sawing region, comprising: a pair of transversely spaced longitudinal parallel guide rails carried by said saw supporting table on each side of said portion defining said substantially horizontal planar sawing region, said parallel guide rails being provided with inwardly directed anti-friction roller means; a movable substantially flat platform slidably mountable between said parallel guide rails and slidably engaging said roller means for longitudinal sliding movement therealong; said platform having a substantially square saw carriage receiving vertically directed aperture therein provided with inwardly extending supporting prongs; a substantially flat square saw carriage of plate-like configuration removably and selectively engageable with the corresponding square saw carriage receiving aperture and supporting prongs in substantially inverted position with the saw blade of a portable hand saw projecting upwardly therefrom in any of four different perpendicularly related positions extending upwardly through said substantially horizontal planar sawing region immediately above said flat platform and said guide rails; the mating square corners of said saw carriage receiving aperture and said saw carriage comprising keying means effectively keying and locking said saw carriage in said saw carriage receiving aperture in any of said four different perpendicularly related positions; said square saw carriage being provided with a saw blade receiving slot substantially parallel to two sides thereof and substantially perpendicular to the other two sides thereof, a projecting engaging lip means cooperable to removably receive and hold at least one edge of a portable hand saw base plate, and a selectively engageable laterally spring biased catch cooperable to removably hold another edge of said portable hand saw base plate whereby to removably mount said portable hand saw with respect to said saw carriage with the saw blade extending through said slot; transverse sawing guide means carried by the table in a direction extending across the longitudinal guide rails adjacent one end of the table whereby to guide lumber therealong while sawing same with said saw blade of said portable hand saw; transverse measuring scale means effectively carried by the table in a direction extending perpendicularly transversely across the longitudinal guide rails at one end of the table to facilitate measuring the length of a piece of lumber being cross cut by moving the platform along the guide rails toward said end of the table and thus cross cutting said lumber with said saw blade of said portable hand saw; longitudinal measuring scale means effectively carried by the table in a direction extending substantially parallel to the longitudinal guide rails at one side of the table to facilitate measuring the width of a piece of lumber being rip sawed by moving same perpendicularly transversely across said guide rails while sawing same with said saw blade of said portable hand saw; and platform immobilizing means consisting of vise means engaging the guide rails and selectively inwardly squeezingly operable to lock the platform between said guide rails and selectively outwardly releasably operable to effectively release said platform for longitudinal movement.

9. A saw supporting table having a portion defining a substantially horizontal planar sawing region, said saw supporting table being cooperable to removably and selectively mount a portable power-driven hand saw of the type having a base plate in inverted position with the upstanding saw blade portion thereof in any of several different perpendicularly related positions extending upwardly through said substantially horizontal planar sawing region, comprising: a pair of transversely spaced longitudinal parallel guide rails carried by said saw supporting table on each side of said portion defining said substantially horizontal planar sawing region, said parallel guide rails being provided with inwardly directed anti-friction roller means; a movable substantially flat platform slidably mountable between said parallel guide rails and slidably engaging said roller means for longitudinal sliding movement therealong; said platform having a substantially square saw carriage receiving vertically directed aperture therein provided with inwardly extending supporting prongs; a substantially flat square saw carriage of plate-like configuration removably and selectively engageable with the corresponding square saw carriage receiving aperture and supporting prongs in substantially inverted position with the saw blade of a portable hand saw projecting upwardly therefrom in any of four different perpendicularly related positions extending upwardly through said substantially horizontal planar sawing region immediately above said flat platform and said guide rails; the mating square corners of said saw carriage receiving aperture and said saw carriage comprising keying means effectively keying and locking said saw carriage in said saw carriage receiving aperture in any of said four different perpendicularly related positions; said square saw carriage being provided with a saw blade receiving slot substantially parallel to two sides thereof and substantially perpendicular to the other two sides thereof, a projecting engaging lip means cooperable to removably receive and hold at least one edge of a portable hand saw base plate, and a selectively engageable laterally spring biased catch cooperable to removably hold another edge of said portable hand saw base plate whereby to removably mount said portable hand saw with respect to said saw carriage with the saw blade extending through said slot; transverse sawing guide means carried by the table in a direction extending perpendicularly transversely across the longitudinal guide rails at one end of the table whereby to guide lumber being moved perpendicularly transversely across said guide rails while sawing same with said saw blade of said portable electric hand saw; transverse measuring scale means effectively carried by said transverse sawing guide extending perpendicularly transversely across the longitudinal guide rails at one end of the table to facilitate measuring the length of a piece of lumber being cross cut by moving the platform along the guide rails toward said end of the table and thus cross cutting said lumber with said saw blade of said portable hand saw; longitudinal measuring scale means effectively carried by the table in a direction extending substantially parallel to the longitudinal guide rails at one side of the table to facilitate measuring the width of a piece of lumber being rip sawed by moving same perpendicularly transversely across said guide rails while sawing same with said saw blade of said portable hand saw; and platform immobilizing means consisting of vise means engaging the guide rails and selectively inwardly squeezingly operable to lock the platform between said guide rails and selectively outwardly releasably operable to effectively release said platform for longitudinal movement.

10. A saw supporting table having a portion defining a substantially horizontal planar sawing region, said saw supporting table being cooperable to removably and selectively mount a portable power-driven hand saw of the type having a base plate in inverted position with the upstanding saw blade portion thereof in any of several different perpendicularly related positions extending upwardly through said substantially horizontal planar sawing region, comprising: a pair of transversely spaced longitudinal parallel guide rails carried by said saw supporting table on each side of said portion defining said substantially horizontal planar sawing region, said parallel guide rails being provided with inwardly directed anti-friction roller means; a movable substantially flat platform slidably mountable between said parallel guide rails and slidably engaging said roller means for longitudinal sliding movement therealong; said platform having a substantially square saw carriage receiving vertically directed aperture therein provided with inwardly extending supporting prongs; a substantially flat square saw carriage of plate-like configuration removably and selectively engageable with the corresponding square saw carriage receiving aperture and supporting prongs in substantially inverted position with the saw blade of a portable hand saw projecting upwardly therefrom in any of four different perpendicularly related positions extending upwardly through said substantially horizontal planar sawing region immediately above said flat platform and said guide rails; the mating square corners of said saw carriage receiving aperture and said saw carriage comprising keying means effectively keying and locking said saw carriage in said saw carriage receiving aperture in any of said four different perpendicularly related positions; said square saw carriage being provided with a saw blade receiving slot substantially parallel to two sides thereof and substantially perpendicular to the other two sides thereof, a projecting engaging lip means cooperable to removably receive and hold at least one edge of a portable hand saw base plate, and a selectively engageable laterally spring biased catch cooperable to removably hold another edge of said portable hand saw base plate whereby to removably mount said portable hand saw with respect to said saw carriage with the saw blade extending through said slot; transverse sawing guide means carried by the table in an adjustable direction extending across the longitudinal guide rails adjacent one end of the table whereby to guide lumber therealong while sawing same with said saw blade of said portable hand saw; transverse measuring scale means effectively carried by said transverse sawing guide extending perpendicularly transversely across the longitudinal guide rails at one end of the table to facilitate measuring the length of a piece of lumber being cross cut by moving the platform along the guide rails toward said end of the table and thus cross cutting said lumber with said saw blade of said portable hand saw; longitudinal measuring scale means effectively carried by the table in a direction extending substantially parallel to the longitudinal guide rails at one side of the table to facilitate measuring the width of a piece of lumber being rip sawed by moving same perpendicularly transversely across said guide rails while sawing same with said saw blade of said portable hand saw; and platform immobilizing means consisting of vise means engaging the guide rails and selectively inwardly squeezingly operable to lock the platform between said guide rails and selectively outwardly releasably operable to effectively release said platform for longitudinal movement.

References Cited in the file of this patent

UNITED STATES PATENTS

| | | |
|---|---|---|
| 1,701,948 | Crowe | Feb. 12, 1929 |
| 1,799,215 | Colby | Apr. 7, 1931 |
| 2,495,250 | Gilly | Jan. 24, 1950 |
| 2,496,716 | Hanna | Feb. 7, 1950 |
| 2,555,217 | Young | May 29, 1951 |
| 2,589,554 | Killian | Mar. 18, 1952 |
| 2,697,460 | Barnett | Dec. 21, 1954 |
| 2,711,194 | Fisher | June 21, 1955 |
| 2,722,243 | Nagy | Nov. 1, 1955 |
| 2,729,250 | Gilkey | Jan. 3, 1956 |